US006480105B2

(12) United States Patent
Edwards

(10) Patent No.: US 6,480,105 B2
(45) Date of Patent: Nov. 12, 2002

(54) METHOD AND APPARATUS FOR ALERTING OWNERS OF RECOMMENDED VEHICLE MAINTENANCE

(75) Inventor: Brian S. Edwards, Omaha, NE (US)

(73) Assignee: Auto Advisors, L.LC., Omaha, NE (US)

(*) Notice: Subject to any disclaimer, the term of this patent is extended or adjusted under 35 U.S.C. 154(b) by 0 days.

(21) Appl. No.: 09/746,377

(22) Filed: Dec. 21, 2000

(65) Prior Publication Data

US 2002/0080022 A1 Jun. 27, 2002

(51) Int. Cl.$^{7}$ .................................................. B60Q 1/00

(52) U.S. Cl. .................... 340/457; 340/457.4; 340/459; 340/825.06; 340/825.15; 340/825.55; 364/551; 364/424; 364/579; 707/3; 707/104

(58) Field of Search .............................. 340/457, 457.4, 340/459, 815.4, 825.06, 825.15, 825.55; 364/551, 424, 579; 707/3, 104

(56) References Cited

U.S. PATENT DOCUMENTS 4,404,639 A * 9/1983 McGuire et al. ............ 364/551
4,484,826 A * 11/1984 Horn et al. ................. 400/279
5,195,173 A * 3/1993 Gordon et al. ................ 395/60
5,432,904 A * 7/1995 Wong ......................... 395/161
5,850,209 A * 12/1998 Lemke et al. ............... 345/156
6,122,650 A * 9/2000 Takeyama et al. .......... 707/540

* cited by examiner

*Primary Examiner*—Daniel J. Wu
*Assistant Examiner*—Hung Nguyen
(74) *Attorney, Agent, or Firm*—Suiter & Associates PC

(57) ABSTRACT

A method for alerting a vehicle owner of recommended maintenance on the vehicle the initial step of entering vehicle identification data into a computer system. The computer system includes a database with vehicle maintenance data, a processor for processing the vehicle identification data and selecting appropriate vehicle maintenance data for the owner's vehicle, and a monitor for displaying the selected vehicle maintenance data. The computer will then alert the vehicle owner of specific service items needing attention from the selected vehicle maintenance data displayed. The step of alerting the vehicle owner includes visually alerting the owner with a flashing graphic display for particular service items needing attention.

10 Claims, 7 Drawing Sheets

METHOD AND APPARATUS FOR ALERTING OWNERS OF RECOMMENDED VEHICLE MAINTENANCE

CROSS-REFERENCES TO RELATED APPLICATIONS (Not applicable).

STATEMENT AS TO RIGHTS TO INVENTIONS MADE UNDER FEDERALLY SPONSORED RESEARCH AND DEVELOPMENT (Not applicable).

BACKGROUND OF THE INVENTION (1) Field of the Invention

The present invention relates generally to recommended vehicle maintenance and more particularly to an improved method for alerting an owner of the need for various types of vehicle maintenance.

(2) Background Information

Automobile manufacturers supply vehicle owners with a manual which describes the operation of the vehicle and includes information as to recommended maintenance and schedules of recommended time intervals for such maintenance. In addition, the owner's manual will provide a list of various items on the vehicle which should be checked, replaced, or repaired, at recommended time or mileage intervals.

With the fast pace of society, regular vehicle maintenance is less frequently attempted by the vehicle owner, and is more and more frequently relegated to car dealers, service stations, and other specialized service facilities. In fact, many vehicle owners have difficulty in remembering even very basic maintenance, such as the changing of oil in the vehicle.

Because of the wide variety of makes, models, engine sizes, and other vehicle options available, a service facility must have access to each vehicle's particular maintenance schedules in order to make appropriate recommendations for each vehicle.

BRIEF SUMMARY OF THE INVENTION

It is therefore a general object of the present invention to provide an improved method for alerting a vehicle owner of recommended vehicle maintenance.

Another object is to provide a service facility with maintenance information directly from a manufacturer of a particular vehicle, to permit the service facility to determine the necessary maintenance time periods and mileages for a given vehicle.

Still another object of the present invention is to provide a method for alerting a vehicle owner of needed maintenance which graphically displays necessary maintenance items.

These and other objects will be apparent to those skilled in the art.

The method for alerting a vehicle owner of recommended maintenance on the vehicle includes the initial step of entering vehicle identification data into a computer system. The computer system includes a database with vehicle maintenance data, a processor for processing the vehicle identification data and selecting appropriate vehicle maintenance data for the owner's vehicle, and a monitor for displaying the selected vehicle maintenance data. The computer will then alert the vehicle owner of specific service items needing attention from the selected vehicle maintenance data displayed. The step of alerting the vehicle owner includes visually alerting the owner with a flashing graphic display for particular service items needing attention.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
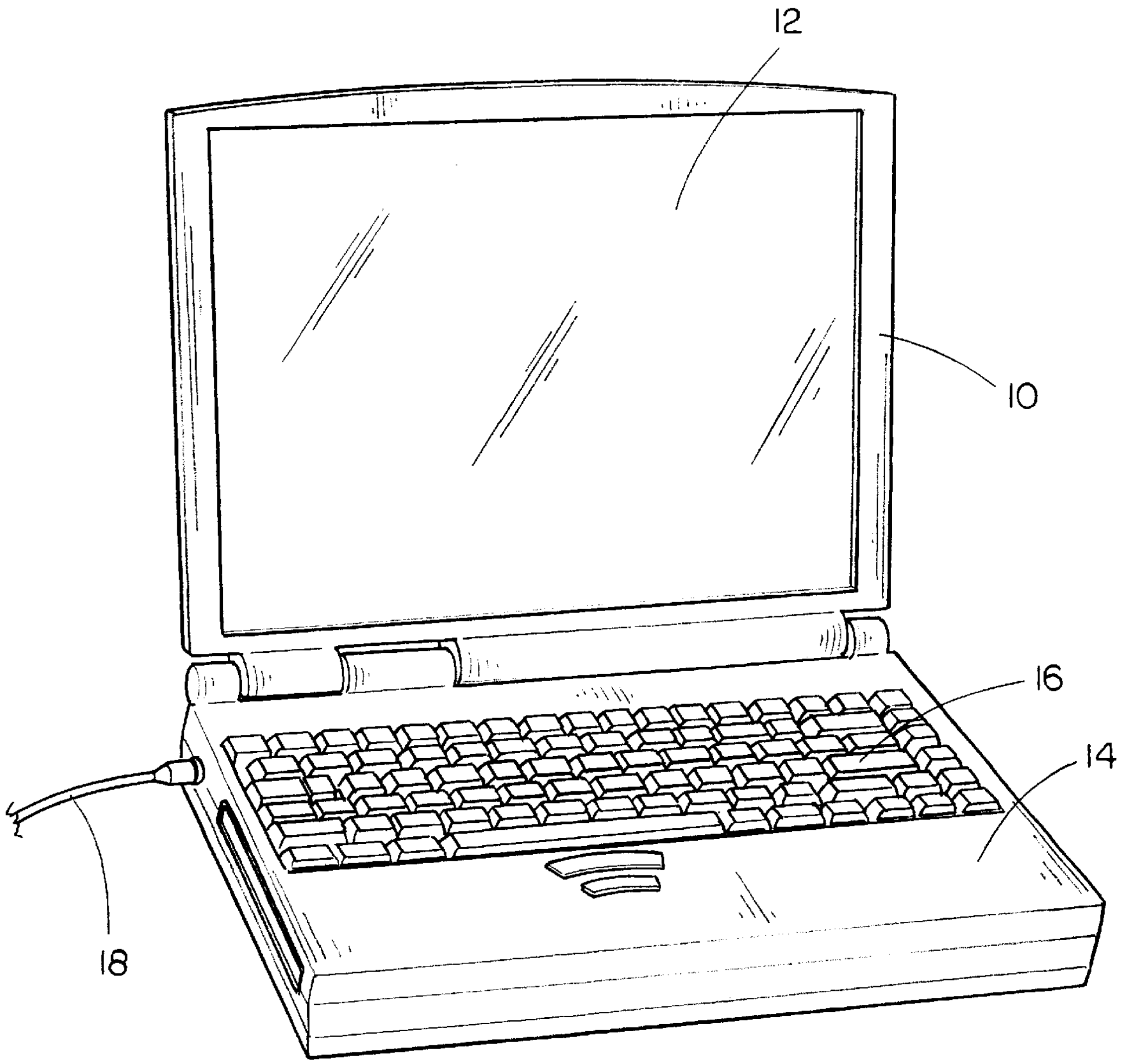
FIG. 1 is pictorial view of a conventional computer system utilized with the method of the present invention.

Referring now to the drawings, and more particularly to FIG. 1, a computer system of any conventional type is shown, and includes a monitor 10 with a screen 12, a central processing unit (CPU) 14 within a housing, and a keyboard 16. The CPU 14 preferably includes a hard drive with memory storage capability for storing a database of vehicle data therein. This database may be periodically updated and revised via communications with the various vehicle manufacturers.

In a preferred form of the embodiment, the CPU may be directly connected via telephone line 18 to the various databases of each vehicle manufacturer. Other methods of updating the database may also be utilized, including periodic downloads from vehicle manufacturers in the form of direct downloads from web sites, or transfer in the form of files on disks. Other methods of data transfer are also contemplated by the invention.

The computer system shown in FIG. 1 is preferably set up at the particular service facility where service on vehicles is to occur. The computer is provided with software which will assist in the method of the present invention.

Typically, it will be necessary for an employee of the service facility to log into the computer, by the entry of an ID number or the like. Once the system is up and running, the initial screen display 20 shown in FIG. 2, will be displayed on the screen of the monitor. The initial screen display requires the input of various information, in order to permit an employee to select the appropriate vehicle maintenance data. Screen display 20 includes a plurality of windows into which information may be inserted in a variety of fashions. For example, the customer name window 22 permits direct input of a customer name via keyboard. In the alternative, a customer already in the computer database may be selected from an existing customer list in the database.

Because most service intervals are based upon the mileage of the vehicle, a mileage window 24 is provided in screen display 20. The license plate number window 26 is provided, in the event that a particular customer has more than one vehicle.

Figure 2:
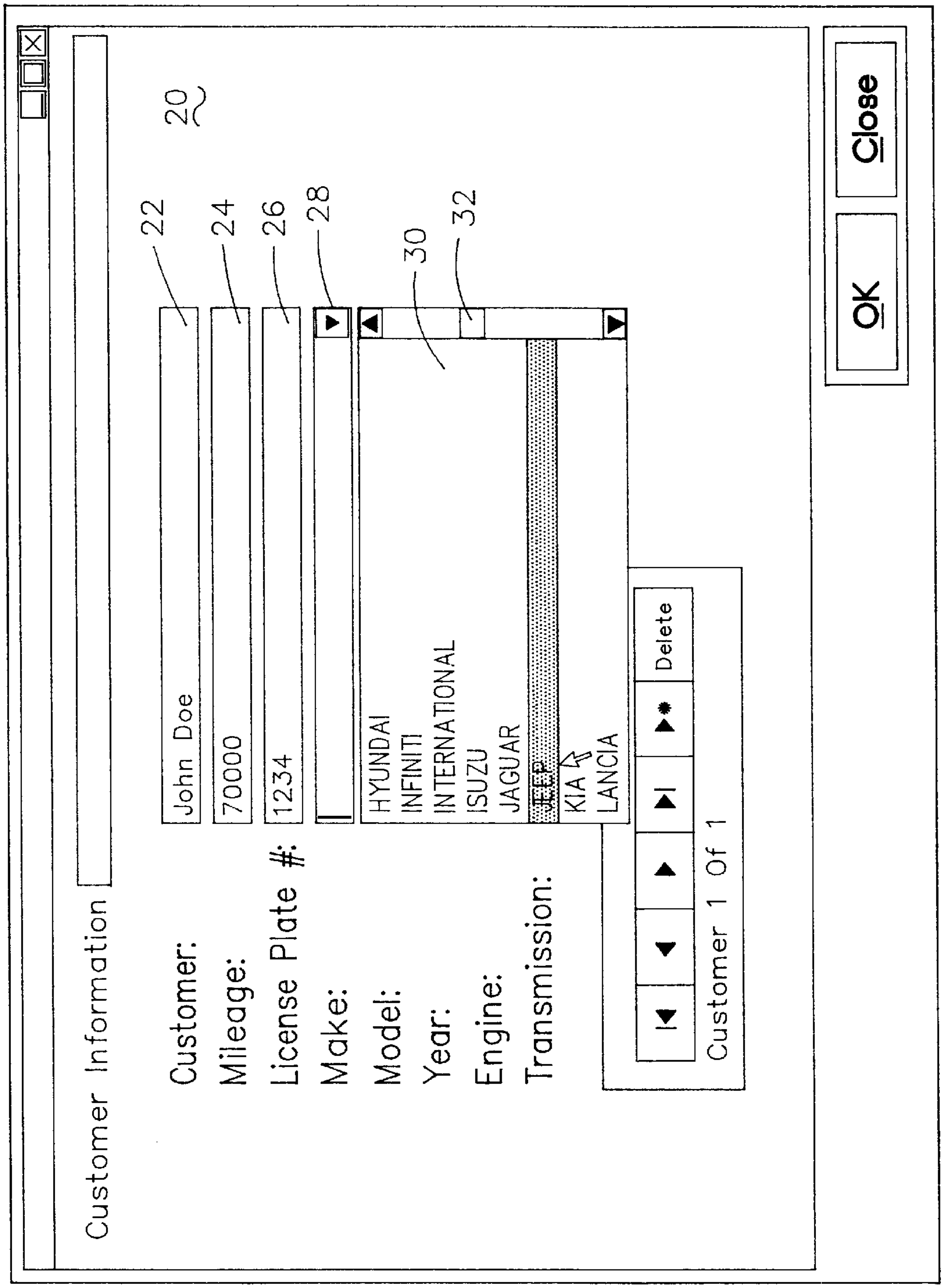
FIG. 2 is a screen display showing the initial step of the method, entering data into the computer.

The "make" window 28 is provided with a scroll list 30 and slide bar 32 to permit the selection of a vehicle make from an existing list. In FIG. 2, "JEEP" has been selected.

Figure 3:
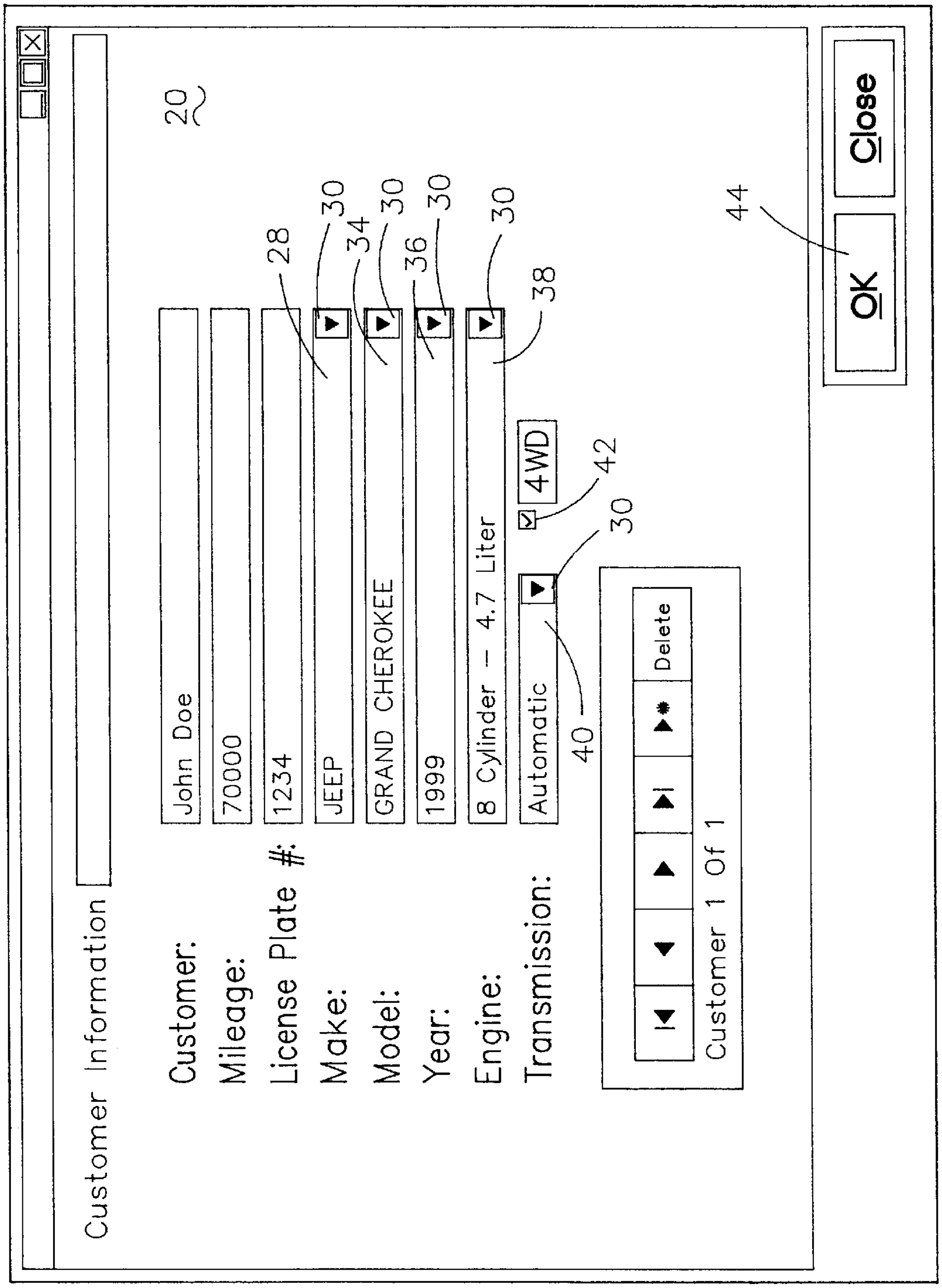
FIG. 3 is a screen display showing a set of customer data entered therein.

Referring to FIG. 3, the remaining windows on screen display 20 include the model window 34, year window 36, engine window 38 and transmission window 40. Each of these windows is also provided with a scroll list 30 to permit the selection of particular data from a data list. Finally, a four-wheel drive window 42 is provided, so that the employee may either select or deselect the existence of a four-wheel drive vehicle.

Figure 4:
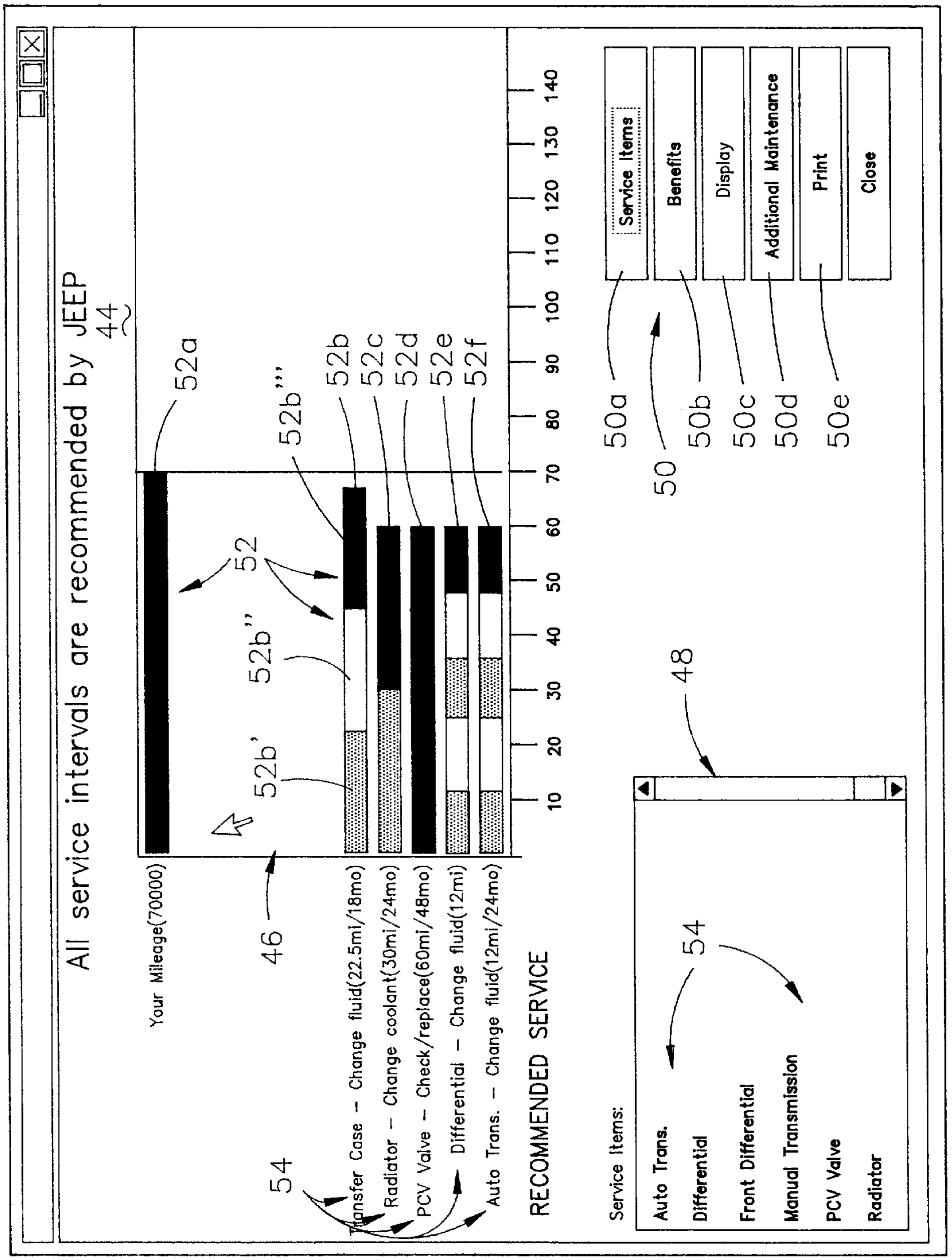
FIG. 4 is a computer screen displaying the manufacturer's recommendations for various service items.

Once all of the vehicle and customer information has been input, the "okay" button 44 is selected, and the service graph screen 44 is displayed, as shown in FIG. 4. Service graph display 44 includes three main areas, a bar graph window 46, a detailed information window 48, and a tool bar 50. Bar graph window 46 is designed to display a plurality of horizontally extending bars 52 extending from a series of service items 54 aligned vertically on the left side of window 46.

The lower edge of window 46 is marked with mileages extending from the left side to the right. Thus, bars 52 will extend a distance relating to the mileage of the vehicle. In the example shown in FIG. 4, the mileage of the vehicle is shown in bar 52*a,* at 70,000 miles. Bars 52*b, c, d, e,* and *f* extend adjacent the following service items: (1) transfer case, (2) radiator, (3) PCV valve, (4) differential, and (5) automatic transmission. Each bar 52*b–f* is divided into individual segments equal to the periodic mileage at which the particular item is to be checked and or replaced. For example, bar 52*b* is broken into segments 52*b*', 52*b*", and 52*b*'". Segments 52*b*' and 52*b*" indicate that transfer case fluid was to be changed at 22,500 miles and 45,000 miles, while segment 52*b*'" indicates that the most recent change should have occurred at 67,500 miles. For each service items 54 which require maintenance, the most recent segment, such as 52*b*'", is preferably colored with bright red and flashes on and off, so as to alert a customer of the need for maintenance. Any prior segments, such as segments 52*b*' and 52*b*", are provided with different colors and do not flash. It should be noted that the use of a flashing alert segment, such as 52*b*'" only occurs if the vehicle has traveled a distance beyond the minimum requirement for that particular service item. Thus, if the vehicle shown in FIG. 4 had traveled only 20,000, bars 52*e* and 52*f* would be the only bars having flashing red segments extending to the 12,000 mile length.

Figure 5:
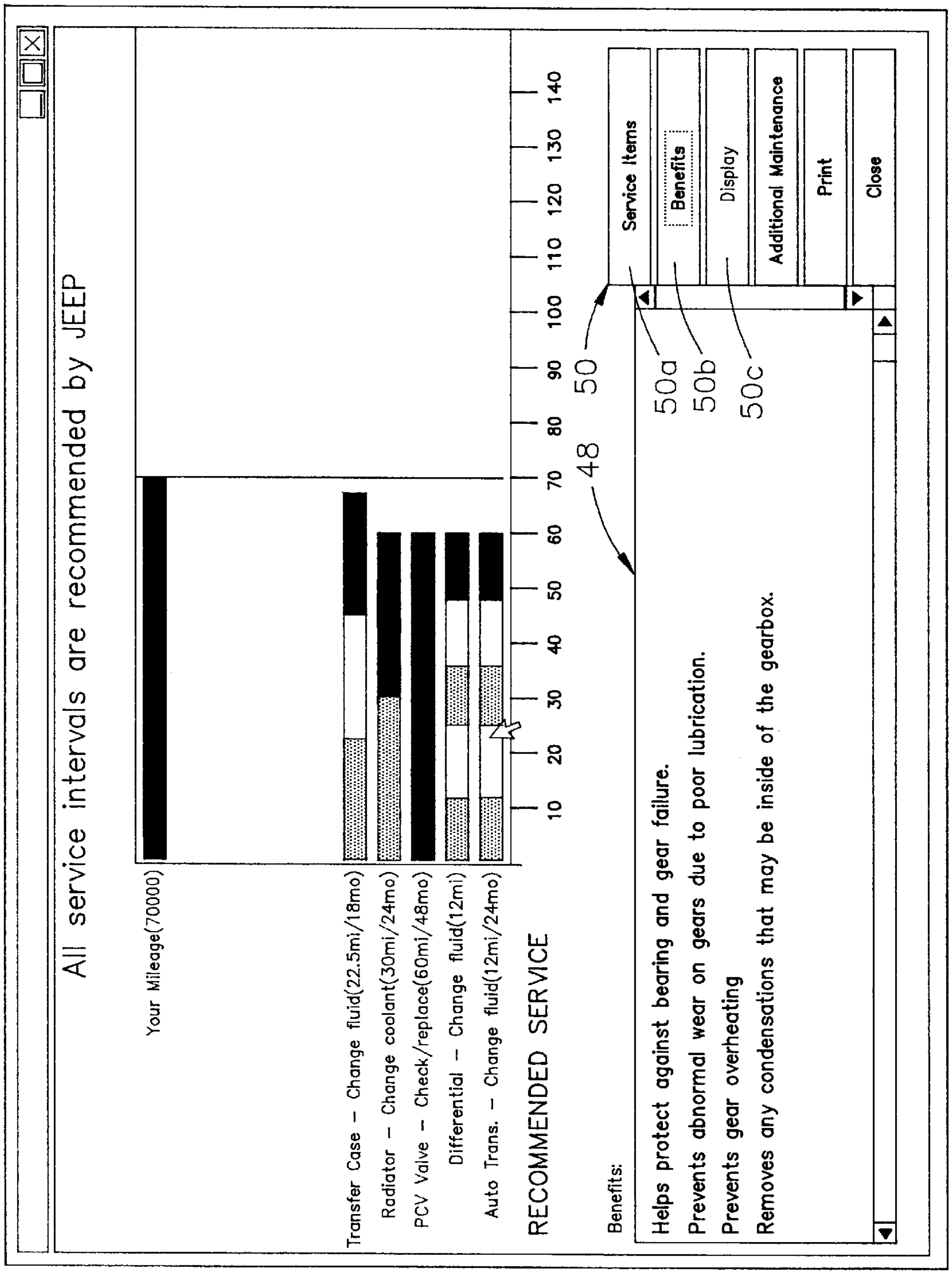
FIG. 5 is a computer screen display showing the benefits of a selected maintenance item.

If the customer has any questions regarding the service item, the particular service item 54 is highlighted in detailed information window 48 and the "benefits" 50*b* is selected to bring up the screen shown in FIG. 5. The screen of FIG. 5 modifies the detailed information window 48 of screen 44, to list the various benefits for the particular service item selected. In FIG. 5, four specific benefits of changing the fluid and the differential are listed. The employee may then return to the original screen graph window 44 shown in FIG. 4 by selecting the "service items" button 50*a.*

Figure 6:
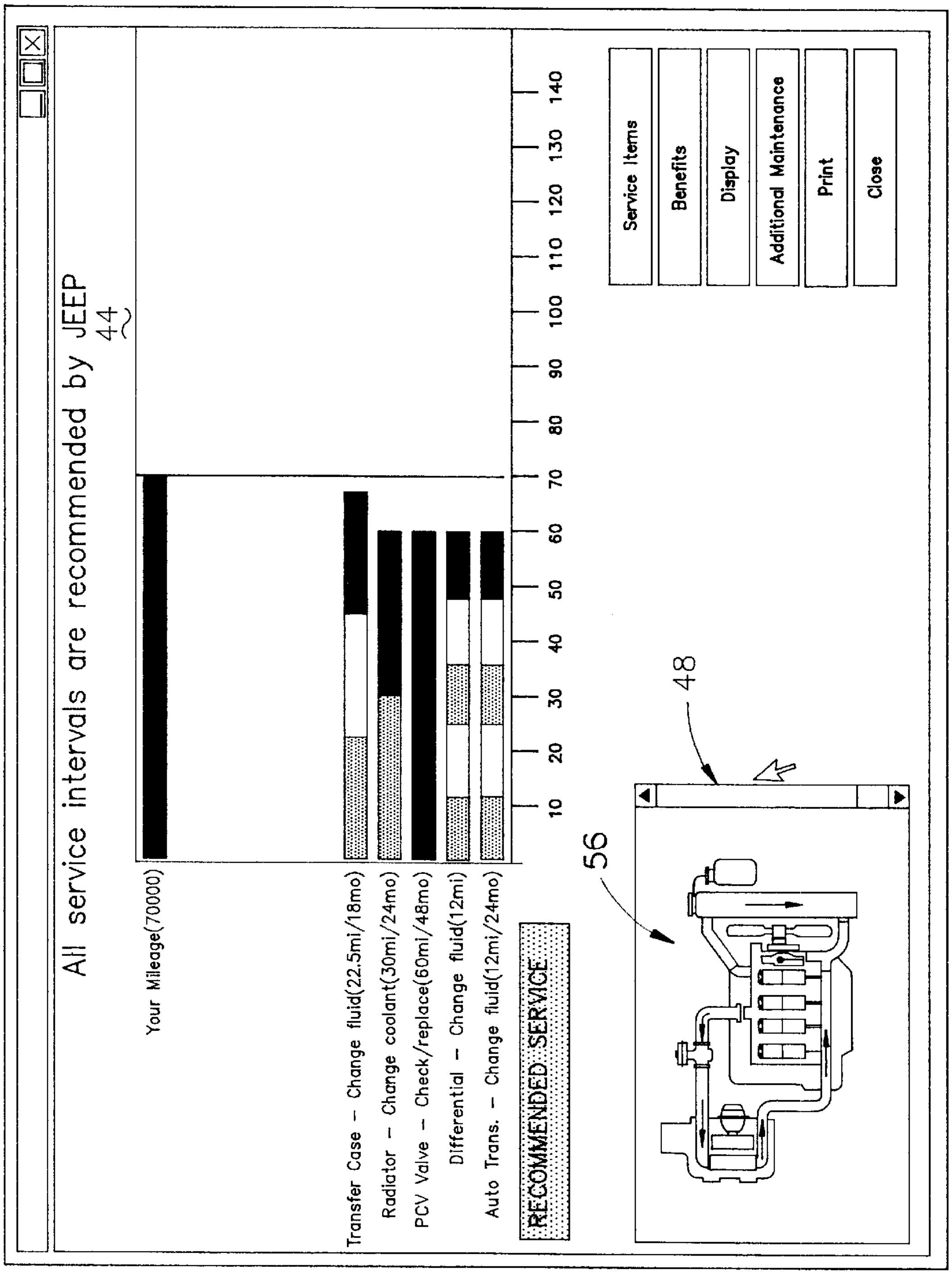
FIG. 6 is a screen display showing an animated graphic display of a selected maintenance item.

If the customer appears to be unclear about the particular vehicle component being displayed, the display button 50*c* may be selected from the screen shown in FIG. 5 to display graphics or animation of the component, as shown in FIG. 6. Information window 48 depicts a graphical animation 56 of the cooling system of the vehicle, in response to the selection of the "radiator" service item.

Once all of the service items 54, shown in screen 44 in FIG. 4 are discussed with the customer, the employee may select the "additional maintenance items" button 50d. This will bring up the screen shown in FIG. 7, with window 48 displaying various maintenance items which are not based upon mileage of the vehicle, but rather an "as needed" basis. For example, the employee may only recommend replacement of the air filter if the filter is dirty upon visual analysis. Similarly, wiper blades are replaced when they appear dry or cracked or the like.

Figure 7:
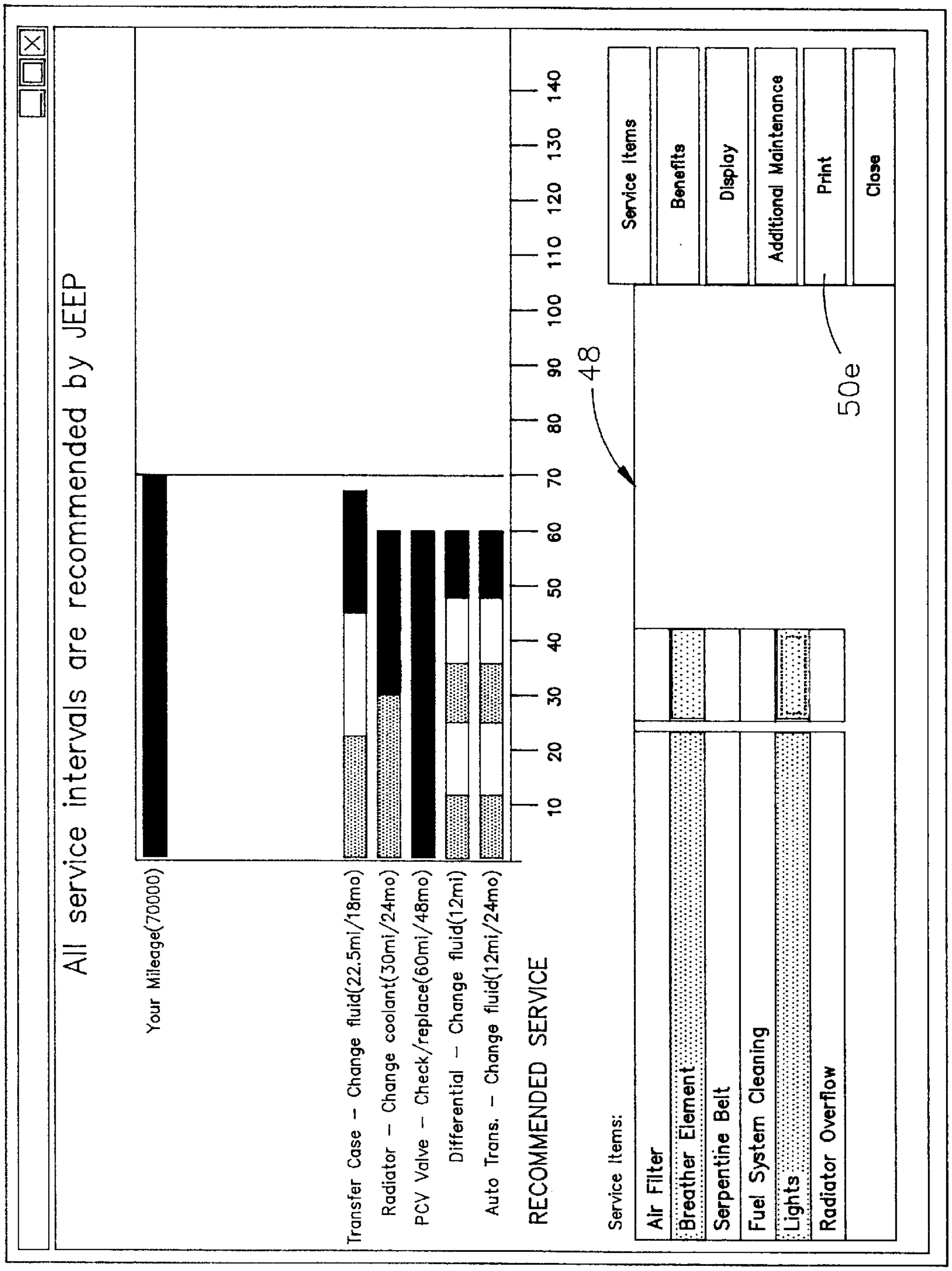
FIG. 7 is a screen display of the service screen with the additional maintenance items selected and displayed.

Finally, once all of these items have been reviewed with the customer, a computer printout of everything shown is accomplished by selecting the "print" 50*e* shown in FIGS. 4 and 7.

Whereas the invention has been shown and described in connection with the preferred embodiment thereof, many modifications, substitutions and additions may be made which are within the intended broad scope of the appended claims. For example, customers may be added to a database in the computer system, so that a full maintenance history may be brought up whenever the customer arrives. Similarly, the databases for various service facilities may be networked to permit that information to be transmitted throughout the country, and available to other service facilities that the customer may use.

I claim:

1. A method for alerting a vehicle owner of recommended maintenance on the vehicle, comprising the steps of:

entering vehicle identification data into a computer system connected to a database with vehicle maintenance data, said computer system including a processor programmed to process the vehicle identification information and select vehicle maintenance data from the database in response to the entered vehicle identification data and a monitor; and displaying the selected vehicle maintenance data by displaying graphics on a screen of the monitor, the graphics including:

a listing of service items for the owner's vehicle;

a graphic display of current mileage of the owner's vehicle; and a graphic display of the appropriate periodic mileage for maintenance of each listed service item, the graphic display including a bar displayed on a graph with segments of different colors, each segment of a length proportional to each periodic mileage of the service item; and said computer system visually alerting the vehicle owner of specific service items from the vehicle maintenance data which need attention and visually emphasizing service items which need attention relative to service items which do not need attention by flashing the graphic display for the emphasized service items.

2. The method of claim 1, wherein visually emphasizing includes flashing a segment of a bar in a color different than non-flashing bars.

3. The method of claim 1, further comprising the step of displaying a list of benefits received by appropriate maintenance of a particular service item.

4. The method of claim 1, further comprising the step of displaying a drawing of major components involved with a particular service item.

5. A method for alerting an owner or service facility of recommended maintenance for a vehicle, comprising:

receiving vehicle identification data from the owner or service facility;

selecting vehicle maintenance data from a database in response to the entered vehicle identification data; and displaying a graphic suitable for alerting the owner or service facility of a service item from the vehicle maintenance data requiring attention and visually emphasizing whether the service item requires attention, the graphic including a bar with at least two segments of different colors, each segment having a length proportional to mileage at which the service item is to be accomplished.

6. The method as claimed in claim 5, wherein the visually emphasizing step includes flashing a segment of the graphic.

7. The method as claimed in claim 5, wherein the visually emphasizing step includes indicating that the service item requires attention by changing the color of a segment.

8. The method as claimed in claim 5, further comprising displaying a benefit of the service item.

9. The method as claimed in claim 5, further comprising displaying a drawing of vehicle components involved with the service item.

10. The method as claimed in claim 5, further comprising displaying current mileage of the vehicle via a second bar having a length proportional to the first bar.

* * * * *